United States Patent [19]

Park

[11] Patent Number: 5,549,351

[45] Date of Patent: Aug. 27, 1996

[54] GUIDE BUMPER DEVICE OF AUTOMOBILE TAILGATE

[75] Inventor: Young-Hwan Park, Kyungsangnam-do, Rep. of Korea

[73] Assignee: Hyundai Motor Company, Ltd., Seoul, Rep. of Korea

[21] Appl. No.: 422,953

[22] Filed: Apr. 17, 1995

[30]       Foreign Application Priority Data

Apr. 21, 1994  [KR]    Rep. of Korea ......................... 94-8386

[51] Int. Cl.⁶ ..................................................... B60J 5/00
[52] U.S. Cl. ............................................. 296/207; 16/868
[58] Field of Search .............................. 296/207; 16/82, 16/86 R, 86 A, 86 B, DIG .6

[56]                References Cited

FOREIGN PATENT DOCUMENTS 2632576  12/1989  France .................................. 296/207

*Primary Examiner*—Andrew C. Pike
*Attorney, Agent, or Firm*—Birch, Stewart, Kolasch & Birch, LLP

[57]                ABSTRACT

A guide bumper device of an automobile tailgate, includes a plastic hollow bumper and a rubber convex/concave bumper for slidably contacting with the plastic hollow bumper whereby the guide bumper device can eliminate a noise, prevent paint peeling from a vehicle, and effectively increase a buffer action.

5 Claims, 2 Drawing Sheets

GUIDE BUMPER DEVICE OF AUTOMOBILE TAILGATE

BACKGROUND OF THE INVENTION

1. Field of the Invention

The present invention relates to a guide bumper device of an automobile tailgate and more particularly, to an improved guide bumper device of an automobile tailgate, which includes a first guide bumper having a hollow space and a second guide bumper having a convex/concave member whereby when the first guide bumper collides with the second guide bumper, the guide bumper device eliminates a noise, prevents the paint of the vehicle from peeling off, and increases a buffer action.

2. Description of Related Art

Various types of guide bumper devices of an automobile tailgate are known in the art. Generally, as shown in FIG. 5, such a guide bumper device includes a rubber guide bumper 53 having a hollow space 51 disposed in one side thereof and a plate 52 formed within the rubber guide bumper 53, the rubber guide bumper 53 being fixed to an end portion of an inner panel 58 of a tailgate 57 by a bolt 55 and a nut 56, the inner panel including a reinforcing member 54 formed thereon, whereby, when the tailgate 57 closes, the bottom surface of the hollow space 51 of the rubber guide bumper 53 collides with a side panel 59 of the vehicle and simultaneously functions as a buffer.

However, these conventional guide bumper devices suffer from a number of problems such as, for example, it generates a loud noise when the tailgate closes, and it tends to peel the paint off of a surface of a side panel of a vehicle since the hollow space of the rubber guide bumper rubs the side panel upon contact therewith.

SUMMARY OF THE INVENTION

Accordingly, it is an object of the present invention to provide an improved guide bumper device of an automobile tailgate, which eliminates the above problems encountered with conventional guide bumper devices of an automobile tailgate.

Another object of the present invention is to provide a guide bumper device of an automobile tailgate, which includes a first plastic guide bumper having a hollow space and a pair of first flanges for attaching to an inner panel by a bolt and a nut, and a second rubber guide bumper having a convex and concave member for slidably colliding with the hollow space of the first plastic guide bumper, a plate inserted into the second rubber guide bumper, and a pair of second flanges for attaching to a side panel by a bolt and a nut, whereby the guide bumper device can eliminate a loud noise, prevent paint on the side panel of a vehicle from peeling off, and effectively increase buffer action.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a guide bumper device of an automobile tailgate, which includes a plastic hollow bumper and a rubber convex/concave bumper for slidably colliding with the plastic hollow bumper whereby the guide bumper device can eliminate noise, prevent paint from peeling off of a vehicle, and effectively increase buffer action.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
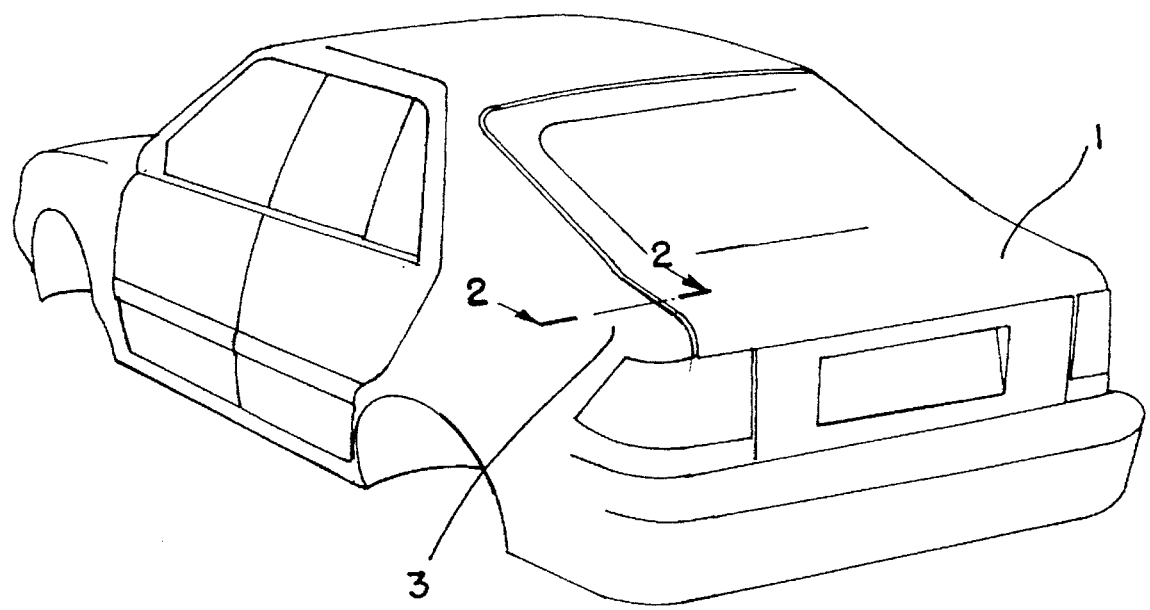
FIG. 1 is a perspective view of a guide bumper device of an automobile tailgate of a vehicle according to the present invention.
Figure 2:
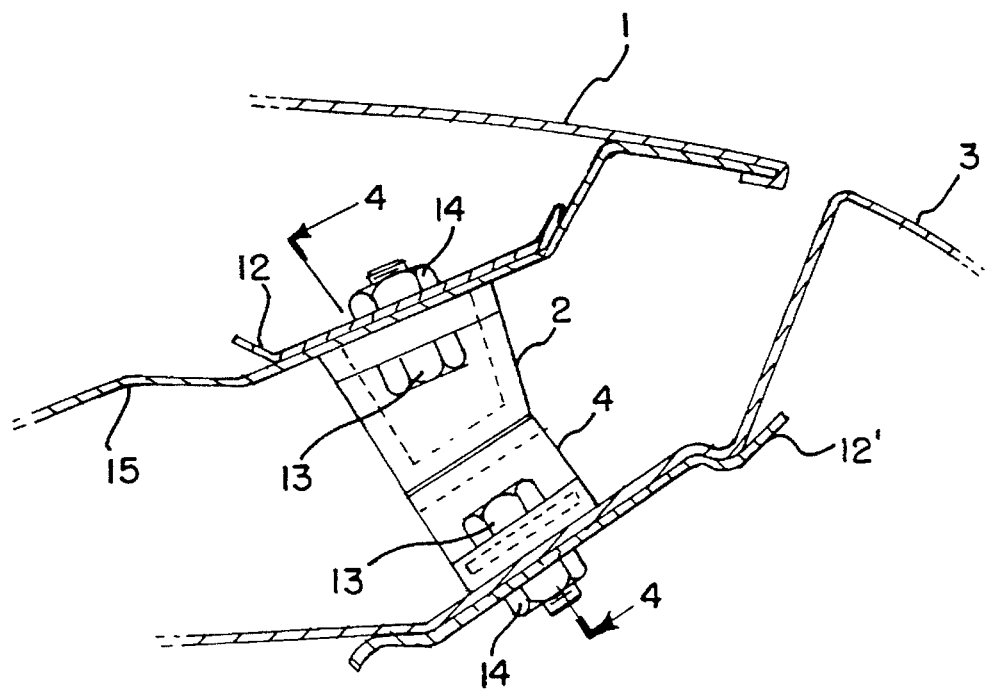
FIG. 2 is a sectional view of FIG. 1, taken along line 2—2 showing the guide bumper device according to the present invention.
Figure 3:
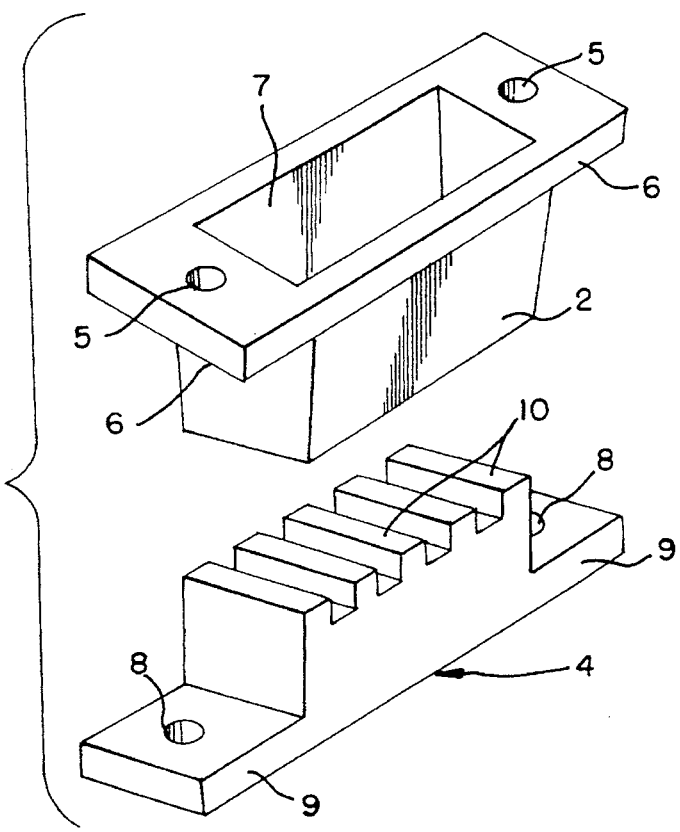
FIG. 3 is a perspective view of a pair of first and second bumpers of the guide bumper device according to the present invention.
Figure 4:
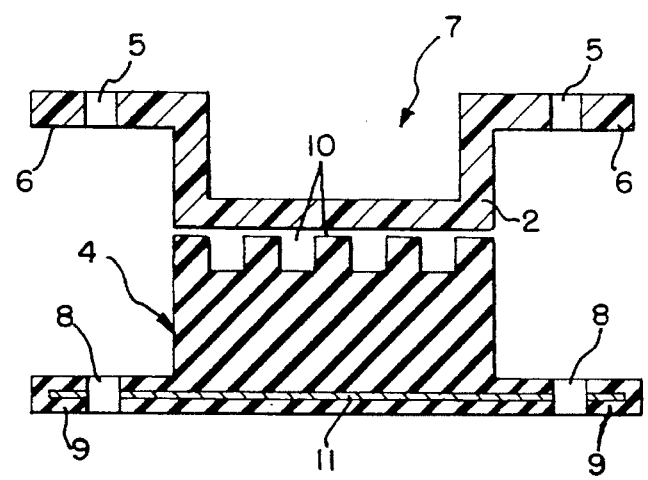
FIG. 4 is a sectional view of FIG. 2, taken along line 4—4.
Figure 5:
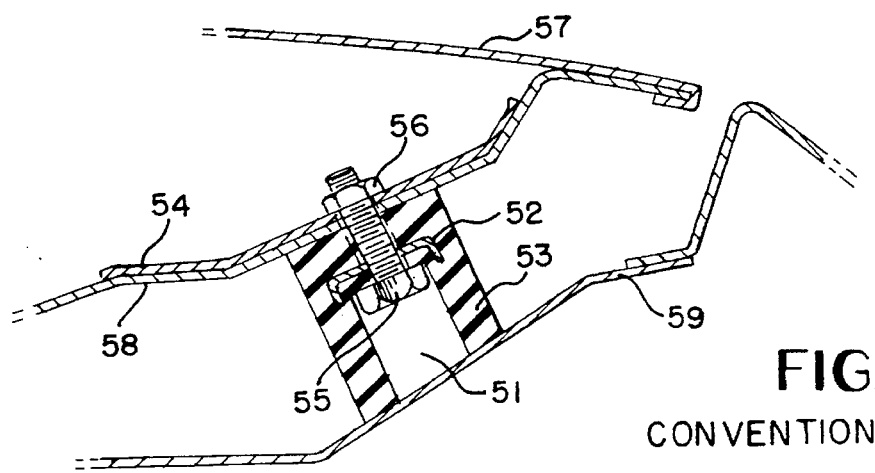
FIG. 5 is a sectional view of FIG. 1, similar to that taken along line 2—2 showing a conventional guide bumper device.

Referring now in detail to the drawings for the purpose of illustrating preferred embodiments of the present invention, as shown in FIGS. 1, 2, 3 and 4, a first guide bumper member 2 is attached to a tailgate 1, and a second guide bumper member 4 attached to a side panel 3 of a vehicle for slidably colliding with the first guide bumper member 2 so as to eliminate a noise, prevent paint on the side panel 3 from peeling off, and increase buffer action.

The first guide bumper member 2 includes a hollow space 7 having an opening disposed on a top portion and a slanted bottom surface, and a pair of first flanges 6 each having a first aperture 5, respectively, for attaching to an inner panel 15 of the tailgate 1 by a bolt 13 and a nut 14 through a first bracket 12.

The second guide bumper member 4 includes an alternatingly convex and concave surface area 10 disposed on a top portion thereof for slidably contacting with the slanted bottom surface of the first guide bumper 2 so as to avoid a blunt or direct contact thereby eliminating the noise, a plate 11 inserted into a lower portion thereof, and a pair of second flanges 9 having a second aperture 8 respectively for attaching to the side panel 3 of the vehicle by the bolt 13 and the nut 14 through a second bracket 12'.

At this time, the convex and concave surface of area 10 functions as a buffer as follows: when the convex and concave surface 10 collides with the slanted bottom surface of the first guide bumper member 2, the convex and concave surface 10 can absorb an impact. Also, since the first guide bumper 2 does not contact with the side panel 3 of a vehicle, the paint on the side panel 3 does not peel off when the first guide bumper member 2 collides with the second guide bumper member 4.

The first and second guide bumper members 2 and 4 are made of plastic, rubber, and the like, and preferably the first guide bumper member is made of plastic and the second guide bumper member is made of rubber.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A guide bumper device of an automobile tailgate of a vehicle, said guide bumper device comprising:

a first guide bumper including a hollow space with an upward opening, and a pair of first flanges each with a first aperture, respectively, for attaching said first guide bumper to an inner panel of the tailgate of the vehicle; and a second guide bumper including an alternatingly convex and concave surface formed on a top portion thereof, a plate inserted into a lower portion thereof, and a pair of second flanges each with a second aperture, respectively, for attaching said second guide bumper to a side panel of the vehicle, whereby when the automobile tailgate closes and said first guide bumper collides with said second guide bumper, the guide bumper device eliminates noise, prevents paint peeling from the side panel, and increases buffer action.

2. The guide bumper device of claim 1, wherein the hollow space is provided with a slanted outer surface of a bottom thereof for indirectly colliding with the surface of said second guide bumper and absorbing a noise generated therebetween.

3. The guide bumper device of claim 1, wherein the first and second guide bumpers are attached to the inner panel and the side panel by a bolt and a nut through a bumper bracket, respectively.

4. The guide bumper device of claim 1, wherein said first guide bumper is made of plastic.

5. The guide bumper device of claim 1, wherein said second guide bumper is made of rubber.

* * * * *